Nov. 4, 1924.
G. N. HEIN
1,514,082
SUNSHADE OPERATING MEANS
Filed Oct. 8, 1923
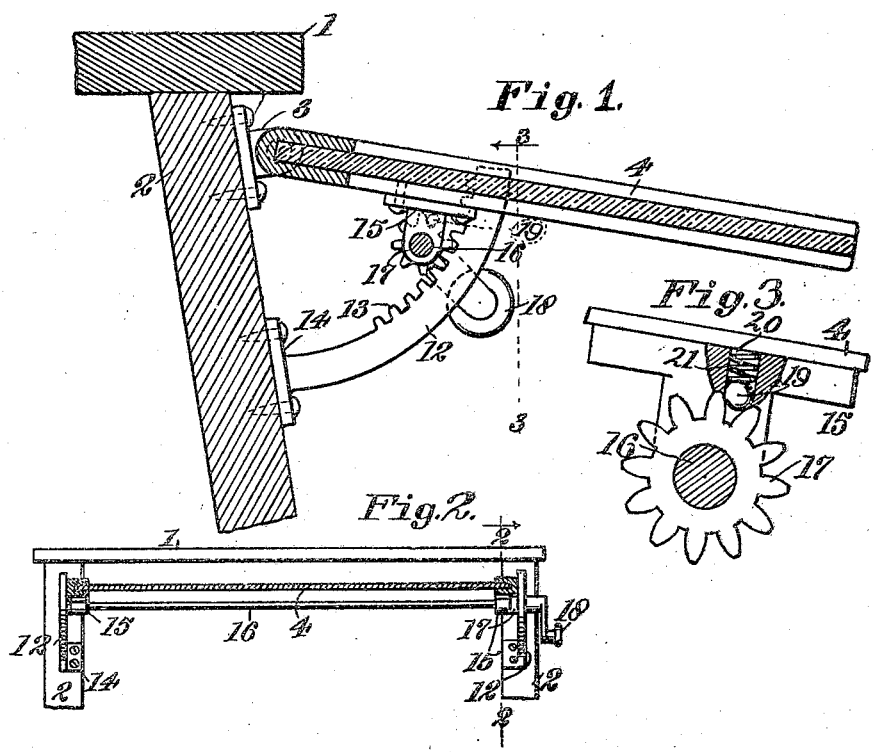
Inventor.
G. N. Hein Patented Nov. 4, 1924.

1,514,082

UNITED STATES PATENT OFFICE.

GEORGE N. HEIN, OF SAN FRANCISCO, CALIFORNIA.

SUNSHADE-OPERATING MEANS.

Application filed October 8, 1923. Serial No. 667,182.

*To all whom it may concern:*

Be it known that I, GEORGE N. HEIN, a citizen of the United States, residing at city and county of San Francisco, and State of California, have invented certain new and useful Improvements in Sunshade-Operating Means, of which the following is a specification.

The present invention relates to an improved form of mechanism to enable the ready adjustment and locking from the vehicle operator's seat of a pivotally mounted body either a sunshade or windshield. The invention consists primarily in the mechanism and arrangement of parts particularly designed for use in connection with those installations already in use and which are desired to be converted into readily adjustable installations.

The invention consists primarily in a rack and a gear cooperating therewith, one carried by the pivotally mounted member either a sunshade or windshield whereby on the operation of the gear the member is raised or lowered and the intermeshing of the gear and rack teeth retain the same locked in its adjusted position.

With the above-mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claim may be resorted to without departing from the spirit or sacrificing any of the advantages of the invention.

In the drawings wherein the disclosure is made in connection with a vehicle sunshade, Fig. 1 is a view in end elevation of an installation where the arcuate toothed segment is carried by the standard and a gear intermeshing therewith is mounted on the sunshade.

Fig. 2 is a sectional view in elevation of the construction illustrated in Fig. 1.

Fig. 3 is a sectional view in detail of the locking device.

In Figs. 1, 2 and 3, the numeral 1 indicates a vehicle top member and 2 an upstanding support providing a standard for a windshield not shown. Fulcrumed as at 3 to swing on a horizontal axis, is a sunshade 4 of any well-known construction.

A pair of segments 12 provided with teeth 13 on their upper surface near their outer end are secured one to the outer face of each standard 2 as at 14. On its under side the frame of the sunshade at diametrically opposite points mounts bearing members 15 in which rotate the opposite ends of a shaft 16. The shaft at its ends mounts a gear 17, one of which intermeshes with the teeth of the respective segments 12. To rotate the shaft a handle 18 extends therefrom and the same is provided with a laterally extending grip portion. In this construction it will be observed that opposite ends of the sunshade are supported by the intermeshing of the teeth of the gears with their respective segments and it will also be observed that the intermeshing of the teeth will retain the sunshade locked in its adjusted position. To releasably lock the shade 4 in its adjusted position, a ball 19 reciprocating in a recess 20 in the bearing members 15 is outwardly pressed by a spring 21 to engage between the teeth of the gear 17, Fig. 3.

I claim:

In combination with a glare shield disposed transversely of and in advance of a vehicle operator, means for mounting the same to pivot on a horizontal axis, a pair of toothed segments extending upwardly from a vehicle part, one adjacent to each end of the glare shield ends, a shaft extended longitudinally of the glare shield, shaft end bearings secured to the glare shield, a pair of gears carried by the shaft to rotate therewith and one engaging each segment, an operating handle associated with the shaft, and a spring pawl for engaging with the teeth of one gear to retain the shaft in its adjusted position.

In testimony whereof I have signed my name to this specification.

GEORGE N. HEIN.